(12) United States Patent
Haimer et al.

(10) Patent No.: US 8,739,661 B2
(45) Date of Patent: Jun. 3, 2014

(54) DEVICE FOR TIGHTENING AND RELEASING CLAMPING TOOLS

(75) Inventors: Franz Haimer, Igenhausen (DE); Wolfgang Kugle, Aichach-Griesbeckerzell (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 917 days.

(21) Appl. No.: 12/447,231

(22) PCT Filed: Oct. 25, 2007

(86) PCT No.: PCT/EP2007/009285
§ 371 (c)(1),
(2), (4) Date: Apr. 24, 2009

(87) PCT Pub. No.: WO2008/049622
PCT Pub. Date: May 2, 2008

(65) Prior Publication Data
US 2010/0013171 A1    Jan. 21, 2010

(30) Foreign Application Priority Data

Oct. 26, 2006 (DE) .......................... 10 2006 050 632
Sep. 14, 2007 (DE) .......................... 10 2007 043 889

(51) Int. Cl.
*B25B 23/14* (2006.01)
*B25B 13/00* (2006.01)
*B25B 13/48* (2006.01)
*B25B 13/56* (2006.01)

(52) U.S. Cl.
USPC .......... 81/467; 81/176.1; 81/124.7; 81/124.2; 81/124.3

(58) Field of Classification Search
USPC ................ 81/124.2, 124.3, 467, 176.1, 124.7
See application file for complete search history.

(56) References Cited

U.S. PATENT DOCUMENTS

| 2,171,872 A | 9/1939 | Zimmerman |
| 2,283,888 A | 5/1942 | Zimmerman |
| 2,345,069 A | 3/1944 | Phillips |

(Continued)

FOREIGN PATENT DOCUMENTS

| DE | 929 840 C | 7/1955 |
| DE | 3804043 A1 | 7/1989 |

(Continued)

OTHER PUBLICATIONS

International Search Report prepared by the European Patent Office on Feb. 14, 2008, for International Application PCT/EP2007/009285.

(Continued)

*Primary Examiner* — Bryan R Muller
(74) *Attorney, Agent, or Firm* — Sheridan Ross P.C.

(57) ABSTRACT

The invention relates to a device (1) for tightening and releasing clamping tools (16), such as draw-in collet chucks, mandrels and the like which allows a torque to be concentrically transferred onto a clamping device, such as a locknut (17), clamping screw or the like without radial stress and without the threaded sections of the clamping device (17) and the collet chuck base (31) or the like being subjected to an unbalanced load. In a preferred embodiment, the device (1) is universally applicable, has an especially simple design and can be rapidly adapted to the respective clamping tools (16).

13 Claims, 5 Drawing Sheets

(56) References Cited

U.S. PATENT DOCUMENTS

| | | | |
|---|---|---|---|
| 2,394,808 A * | 2/1946 | Rohr | 81/176.1 |
| 2,478,195 A | 8/1949 | Hull | |
| 2,570,752 A | 10/1951 | Benjamin et al. | |
| 2,749,134 A | 6/1956 | Penasack | |
| 2,803,133 A | 8/1957 | Casady et al. | |
| 3,385,606 A | 5/1968 | Benjamin et al. | |
| 3,540,748 A | 11/1970 | Buck | |
| 3,906,822 A * | 9/1975 | Hertelendy et al. | 81/90.1 |
| 4,387,906 A | 6/1983 | Nicolin | |
| 4,699,388 A | 10/1987 | Sproccati et al. | |
| 4,955,764 A | 9/1990 | Reinauer | |
| 5,028,178 A | 7/1991 | Ronen | |
| 5,123,663 A | 6/1992 | Mizoguchi | |
| 5,192,086 A | 3/1993 | Bucks | |
| 5,405,220 A | 4/1995 | Ishikawa | |
| 5,549,022 A * | 8/1996 | Knox | 81/124.2 |
| 5,758,883 A | 6/1998 | Brian | |
| 5,788,248 A | 8/1998 | Gibson | |
| 6,155,576 A | 12/2000 | Yorde | |
| 6,572,119 B2 | 6/2003 | Selb | |
| 6,832,433 B2 | 12/2004 | Kramer | |
| 6,923,451 B2 | 8/2005 | Taguchi et al. | |
| 7,038,334 B2 | 5/2006 | Botos et al. | |
| 7,549,953 B2 | 6/2009 | Walters | |
| 7,673,882 B2 | 3/2010 | Tanga | |
| 2006/0115337 A1 | 6/2006 | Higashi | |
| 2010/0117311 A1 | 5/2010 | Haimer | |
| 2010/0148455 A1 | 6/2010 | Taguchi | |
| 2011/0158759 A1 | 6/2011 | Jansen et al. | |

FOREIGN PATENT DOCUMENTS

| | | | |
|---|---|---|---|
| DE | 4405242 | | 8/1995 |
| DE | 19826885 | | 12/1999 |
| DE | 69515672 | | 9/2000 |
| DE | 202004010714 | | 9/2004 |
| DE | 202005003837 | | 5/2005 |
| DE | 102005016161 | | 10/2006 |
| EP | 0618030 | | 10/1994 |
| EP | 0637484 | A | 2/1995 |
| EP | 0834371 | | 4/1998 |
| EP | 1449607 | | 8/2004 |
| EP | 1616647 | | 1/2006 |
| EP | 1710033 | | 10/2006 |
| FR | 1176761 | A | 4/1959 |
| FR | 2814101 | A | 3/2002 |
| FR | 2814101 | A1 * | 3/2002 |
| GB | 293529 | A | 7/1928 |
| JP | 57-184610 | | 11/1982 |
| JP | 01-121181 | | 5/1989 |
| JP | 01-295704 | | 11/1989 |
| JP | 06-277916 | | 10/1994 |
| JP | 9-155609 | | 6/1997 |
| JP | 10-034411 | | 2/1998 |
| JP | 2002-052431 | | 2/2002 |
| JP | 2002-126919 | | 5/2002 |
| JP | 2002-166310 | | 6/2002 |
| JP | 2002-263929 | | 9/2002 |
| JP | 2004-249440 | | 9/2004 |
| JP | 2005-177982 | | 7/2005 |
| JP | 2005-313263 | | 11/2005 |
| JP | 48-99985 | | 10/2008 |
| JP | 2009-253965 | | 10/2009 |
| WO | WO 9605012 | | 2/1996 |
| WO | WO 02/057039 | | 7/2002 |

OTHER PUBLICATIONS

ISO 15488—Collets with 8 degree setting angle for tool shanks—Collets, nuts and fitting dimensions "International Standard—ISO, Zuerich, CH 2003".

Official Action for U.S. Appl. No. 12/446,121 mailed Jan. 14, 2013, 16 pages.

Official Action for U.S. Appl. No. 12/446,121 mailed Dec. 11, 2013, 14 pages.

\* cited by examiner

DEVICE FOR TIGHTENING AND RELEASING CLAMPING TOOLS

CROSS REFERENCE TO RELATED APPLICATIONS

This application is a national stage application under 35 U.S.C. 371 of PCT Application No. PCT/EP2007/009285 having an international filing date of 25 Oct. 2007, which designated the United States, which PCT application claimed the benefit of German Application Nos. 102006050632.4 filed 26 Oct. 2006 and 102007043889.5 filed 14 Sep. 2007, the entire disclosure of each of which are hereby incorporated herein by reference.

The present invention relates to a device for tightening and releasing clamping tools according to the preamble of patent claim 1 and to a key insert for such a device.

Various clamping tools such as draw-in collet chucks and mandrels are known, in which objects like tools or work pieces are fixated through clamping. With respect to draw-in collet chucks, e.g. SK-, HSK- and polygon tool receivers are known, like e.g. ER- or OZ systems. Such clamping tools thus always comprise a base with a collet chuck and a clamping device, like a locknut for clamping chucks and a clamping screw for mandrels or similar, which is screwed onto the base and which clamps the collet chuck. With respect to the exact configuration of a draw-in collet chuck, DE 10 2006 050 632.4 is referred to, whose entire disclosure is hereby incorporated by reference.

It is the object of the present invention to provide a device for tightening and releasing clamping tools, by means of which torque can be transferred in a centric manner, and thus the threads of the collet chuck base and similar and of the clamping device are not loaded on one side. Thus, the device shall be universally usable and simple in construction.

The object is accomplished by a device according to claim 1 and by a key insert. Advantageous embodiments are provided in the respective dependent claims.

The device according to the invention comprises at least two operating handles, disposed symmetrical with respect to a plane extending through the rotation axis of the device. Furthermore, the device is adapted to the outer circumferential contour of the clamping device, so that when the device is rotated, a torque is transferred to the clamping device for tightening and releasing the clamping device relative to the base of the clamping device. This device facilitates precise rotation of the clamping device when a torque is imparted, while avoiding transversal forces, which can otherwise lead to a canting of the clamping device and thus of the collet chuck, within the clamping tool, and thus reduce the rotating precision of the clamping tool. Furthermore, by avoiding transversal forces, it is also assured that the threads of the collet chuck base or of the base of the clamping tool and of the clamping device are not loaded on one side.

When the handles are disposed in a plane, in which also the clamping device is disposed, thus when the line of effect of the opposite handles intersects the rotation axis and also the clamping device, a tightening and releasing without transversal forces is automatically assured, when the device is actuated with both hands.

However, when, a one hand operation is performed in this configuration or an operation where the two handles are loaded with different forces, the tightening without transversal forces, when exclusively imparting a torque, is not assured.

Therefore, it can be advantageous, when the plane, in which the handles are disposed, does not extend through the clamping device, thus when the handles are disposed in a plane, which is disposed above or below the clamping device. Thus, the handles are axially offset with respect to the clamping device and configured with an elbow. Thus, the device, when handled only on one side or handled asymmetrically, this means handling with different force application on the respective handle, will slip from the clamping device. The device thus can only be actuated with both hands and symmetrically, which prevents such handling errors. Preferably, a removable key insert is provided for transmitting the torque onto the clamping device. With this key insert, the device is universally usable, since it can be adapted to various clamping devices. Thus, various clamping tools can be tightened and released with a single device.

In a useful manner, the key insert is disposed in a ring groove type recess in the device, wherein the ring groove type recess is configured in particular around a circular segment shaped recess. Thus, a very simple design for a connection of the device and of the key insert is provided.

In an advantageous manner, the key insert is fixated with at least one threaded or inserted connection in the device. The exchange of the key insert can thus be performed very quickly, in particular, when the connection is configured as a plug-in connection.

A very safe connection is accomplished, when the threaded or plug-in connection at least partially reaches through the key insert and through the ring groove type indentation.

In a particularly simple and fast manner, the connection can be released and established again, when the plug-in connection comprises a clip type element with a bolt, wherein the clip type element is removably disposed in a respective indentation of the device.

In order for the plug-in connection not to be releasable independently, it is useful when an interlocking connection is provided between the clip type element and the device, wherein said interlocking connection is provided in particular through a spring loaded ball element, a rubber or similar. In this case, when removing the clip type element, the resistance of a protruding ball or of a protruding rubber has to be overcome, so that a removal is only possible under respective force application.

The removal of the clip type element can be advantageously facilitated by the clip type element forming a grip element in conjunction with the corresponding indentation in the device, by means of which the clip type element can be removed from the indentation, wherein the clip type element is configured in particular L-shaped.

Preferably, the plug-in is eccentrically disposed relative to the rotation axis of the key insert.

In a particularly preferred manner, the plug-in connection comprises a fit between the clip type element and the device. Thus, the key insert can be reproducibly disposed in the device.

Preferably, means for determining the torque are provided in the device. An overload of the threads or an insufficient tightening of the locknut can thus be prevented. In a simple manner, the means for determining the torque is configured by providing an elastically supported element, which acts against the key insert. Said elastically supported element can be elastically supported by means of a circular spring, disk spring, coil spring, leaf spring, by a pneumatic or hydraulic cylinder.

In order to display the torque, the means for determining the torque can comprise a mechanical or electronic dial indicator. The dial indicator can thus comprise a display of the actual torque or a display of the maximum permissible torques for various clamping diameters and sizes of clamping systems. Advantageously, thus plural graduations for various clamping systems are provided. Preferably, the graduation and/or the dial indicator are disposed so that they can be exchanged. In an electronic dial indicator, the graduation can be configured switchable.

Alternatively, the means for determining the torque can comprise a pressure transducer, which is configured pneumatic, hydraulic or electronic.

The device thus can be kept very compact when not in use by configuring the handles removable from the device.

Independent patent projection is sought for a key insert for the device according to the invention for tightening and releasing clamping tools, wherein the key insert comprises a lateral opening and, in particular a substantially ring segment type configuration. Thus, the key insert is adapted to the outer circumferential contour of the clamping tool, so that during rotation of the clamping device with the key insert, a torque for tightening or releasing the clamping tools relative to the base of the clamping device is provided. Through the lateral opening, the device can be moved to the clamping device by the key insert from the side, and it is not necessary to insert or extract the key insert through a tool or work piece clamped in the clamping tool.

The key insert preferably comprises protrusions, which are adapted to engage respective indentations of clamping devices, like locknuts, clamping screws and similar. Thus, the torque can be transferred quite safely and it is assured that only the correct key insert can be used for the respective clamping system and for the diameter of the clamping device. The key insert preferably comprises an eccentric bore hole for receiving an element for a plug-in connection with the device.

In a preferred embodiment, a contact surface for a pressure sensor or an elastically supported element is provided at the key insert. Preferably, furthermore a contact surface for a dial indicator is provided.

Further advantages, characteristics and features of the present invention are now illustrated in the context of the description of the drawing, wherein.

Figure 1:
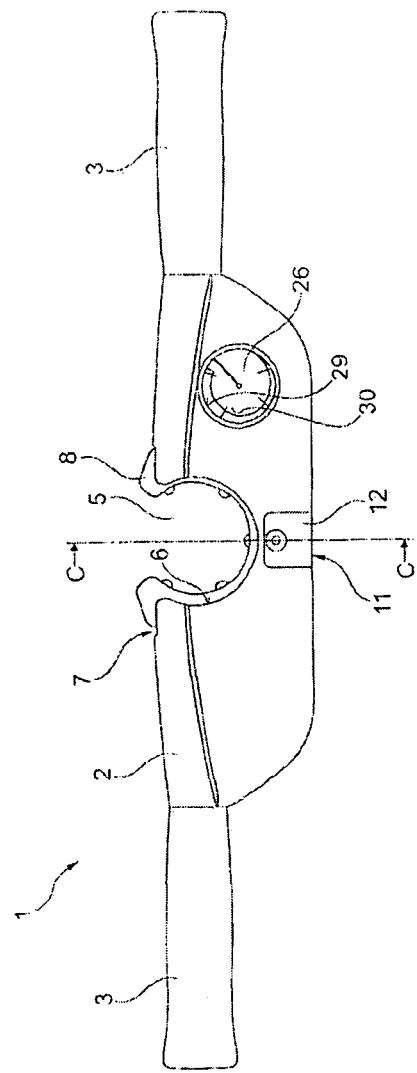
FIG. 1 shows a preferred embodiment of the device according to the invention in a top view.
Figure 2:
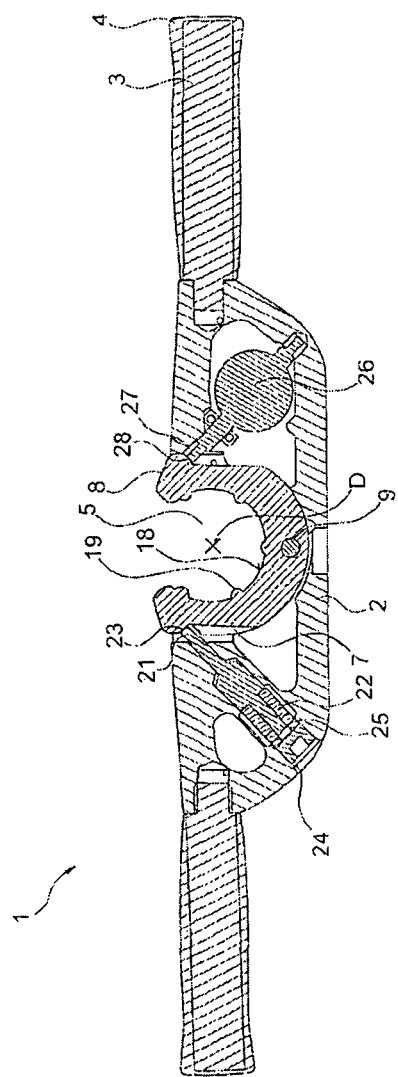
FIG. 2 shows the device according to the invention according to FIG. 1 in a first sectional view.

FIG. 1 purely schematically depicts a preferred embodiment of the device 1 according to the invention for tightening and releasing clamping tools in a top view, with FIG. 2 showing a sectional view thereof. The device 1 comprises a metal housing 2, at which two opposed handles 3 are attached, which are provided with a rubber coating 4 for increasing operator comfort.

Figure 3:
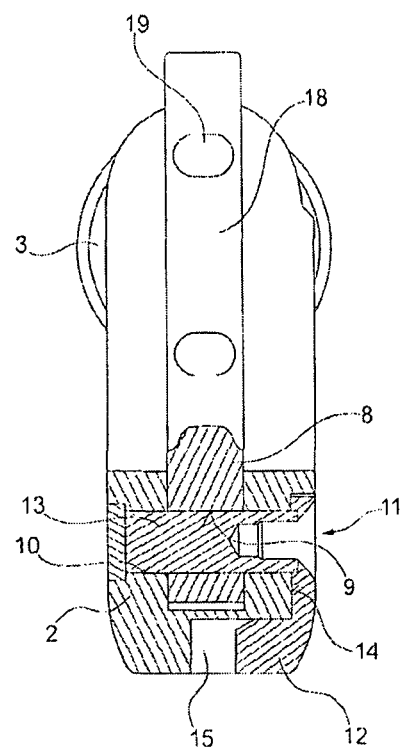
FIG. 3 shows the device according to the invention according to FIG. 1 in a second sectional view along the line C-C.
Figure 4:
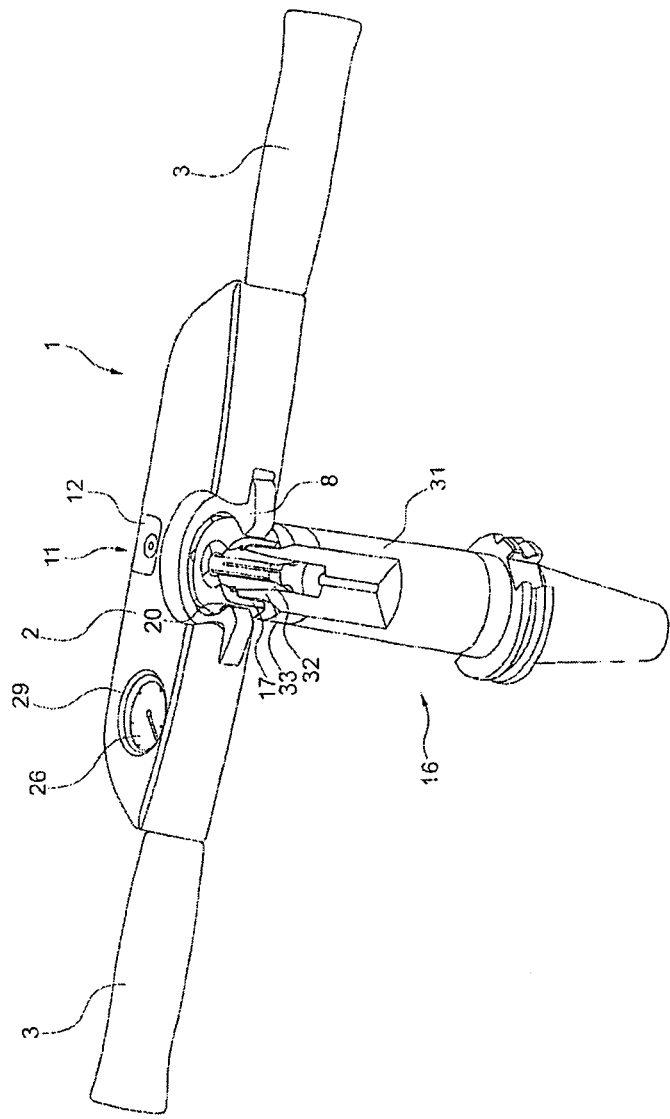
FIG. 4 shows a device according to the invention according to FIG. 1 interacting with a clamping tool.

The housing 2 comprises a preferably circular segment shaped recess 5, in whose circumferential surface 6, a groove 7 is disposed, which is used for receiving a key insert 8. Said key insert 8 is coupled to the housing 2 through a link, which is configured as a plug-in connection in this configuration. For this purpose, as evident in particular from FIG. 3, the key insert 8 comprises a pass-through bore hole 9, and the housing 2 comprises a corresponding bore hole 10. Furthermore, a clip type element 11 is provided, which comprises an L-shaped clip 12 and a bolt 13 for the plug-in connection. The clip 12 is disposed in a recess or indentation 14 of the housing 2, wherein the bolt 13 reaches through the bore holes 9, 10.

Figure 5:
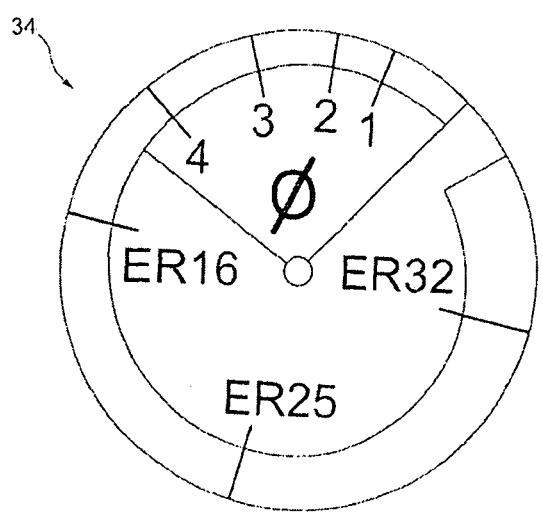
FIG. 5 shows a preferred embodiment of the graduation of a dial indicator of the device.

Due to the fit between the bolt 13 and the bore holes 9, 10, there is a reproducible disposition of the key insert 8 in the housing 2. Since the clip 12 does not completely fill the indentation 14 in the portion 15, it is easy to manually reach behind the clip type element 11 and to thus pull it out of the housing 2. Thus, a quick change system for various key inserts 8 is provided in order to adapt the device 1 to various clamping tools 16 and their locknuts 17 (re. FIG. 5) and similar. Thus, at an inner circumferential surface 18 of the key insert 8, respective protrusions 19 are provided, which correspond to respective indentations 20 of the locknut 17, in order to be able to impart a torque onto the locknut 17. Thus, the locknut can comprise quite varied outer contours, as long as they facilitate a transmission of a torque through the key insert 8 adapted thereto.

The key insert 8 comprises an annular segment type shape, this means it is laterally open. Thus, the device 1 can be moved by the key insert 8 from the side to the locknut 17, and it is not necessary to insert or extract the key insert 8 by a tool clamped into the draw-in collet chuck 16 (not shown). The same advantage naturally also applies for mandrels with their clamping screws.

In order to determine the torque imparted by the device 1 onto the locknut 17, another pressure bolt 21 is furthermore provided in the housing, which is elastically supported relative to the housing 2 by means of a circular spring 22. The pressure bolt 21 contacts the key insert 8 at a first contact surface 23. Through an adjustment screw 24 and a pressure washer 25, at which the circular spring 22 is supported, the position of the pressure bolt 21 can be adjusted.

Opposite to the pressure bolt 21, a dial indicator 26 is provided in the housing 2, whose feeler 27 contacts a second contact surface 28 of the key insert 8. The dial indicator 26 can be read through a window opening 29 in the housing 2.

When imparting a torque in pullout direction on the locknut 17 through the device 1, the key insert, which is pivotably supported relative to the bolt 13, is pressed about the bolt 13 against the pressure bolt 21, and thus acts against the force of the circular spring 22. The impression depth of the pressure bolt 21 into the housing 2 thus constitutes a measure for the imparted torque, which can thus be directly read by suitable conversions on the dial indicator 26, where the second contact surface 28 moves away from the dial indicator 26, and thus feeler 27 can move out of the dial indicator 26 by a certain distance.

Instead of two grips 3, the device 1 can e.g. also be configured in the form of a control wheel, wherein then an indefinite number of handles is disposed symmetrical to the rotation axis or symmetrical to a plane extending through the rotation axis. Also, in such a configuration with more than two handles, a torque transfer without transversal forces can be assured.

On the dial indicator 26, preferably markings 30 for the maximum permissible tightening force of the respective clamping tool systems 16, in the embodiment ER 16, ER 25 and ER 32 are indicated, and also for the maximum permissible tightening force for small collet diameters, in the embodiment diameters of 0.5 to 4 (re. FIG. 5), so that an overloading and also too little tightening of the locknut 17 is evident.

Due to the symmetrical disposition of the handles 3 with reference to the center of the key insert 8, which is disposed on the rotation axis D of the device 1, wherein the center is thus located on a connection line of the two handles 3, the torque transferred through key insert 8 is centrally transferred into the locknut 17, wherein no transversal forces occur. Thus, one sided loads of the thread of the locknut 17 and of the base of the collet chuck base 31 are prevented, and it is assured that the collet chuck 32 is pressed into the collet chuck receiver 33 exactly in axial direction.

The handles 3 are thus disposed in a plane, in which also the locknut 17 is disposed. A tightening without transversal forces is thus assured, when both handles are tightened with the same force. In order to prevent too much tightening on one side, or to completely prevent entirely unilateral and thus one handed tightening as a matter of principle, it can be provided that the plane, in which handles are disposed, extends above or below the locknut with an axial offset (not shown), whereby due to the elbow, in case of uneven tightening, a cant of the device would be caused, which makes the malfunction evident.

Instead of a circular spring 22, also a disk spring, coil spring, leaf spring, a pneumatic or hydraulic cylinder can be used, as long as said elements provide a sufficient opposite force for the torque to be imparted. Alternatively, the housing itself can be used as an elastic element. The system to determine the torque can thus either be configured as a push system or as a pull system, this means it can determine torques when rotating counterclockwise or clockwise (as illustrated). In a double configuration, thus a configuration on top of one another (not shown) of one respective pressure bolt 21 and a dial indicator 26, a determination on both sides can also be performed.

The dial indicator 26 itself can operate mechanically as illustrated or it can also operate electronically. Thus, it can, as depicted, operate measuring indirectly or directly. Instead of the maximum torques, the display of the dial indicator 26 can also indicate the directly determined torques, wherein then on the housing 2, in a useful manner, a table for the maximum permissible torques is provided. The graduation 34 can then, as depicted in FIG. 5, be disposed replaceable in the dial indicator 26 or it can be provided switchable in electronic dial indicators. Also, several graduations for various clamping tool systems can be depicted simultaneously.

As an alternative to the determination by the pressure bolt 21 and the dial indicator 26, a pressure transducer can also be provided, which can be configured electronic, pneumatic or hydraulic.

It has become evident from the preceding descriptions, that the present invention provides a device 1 for tightening and releasing clamping tools 16, by means of which a torque can be centrally imparted onto a locknut 17. Thus, the threads of the locknut 17 and of the collet chuck base 31 and similar are not loaded on one side. Furthermore, the device 1 is universally usable, configured particularly simple and can be adapted to the respective clamping tools 16 very quickly.

What is claimed is:

1. A device for tightening and releasing clamping tools, where the clamping tool comprises a clamping device, such as a locknut, a clamping screw or the like, and a base with a thread, which is complementary to the thread of the clamping device, wherein the device comprises
   a housing having two handles, symmetrically disposed with reference to a plane including a rotation axis of the device configured to symmetrically provide a torque for tightening or releasing the clamping device relative to the base of the clamping tool upon a rotation of the clamping device;
   a key insert pivotally supported relative to the housing configured for transferring said torque to said clamping device, wherein the key insert is connected by one of a screw in connector or a plug in connector within the housing and is removable from the housing, wherein the key insert comprises a lateral opening, and wherein the key insert is disposed eccentric to a rotation axis of the key insert relative to the housing that is defined by the screw in connector or the plug in connector passing through the key insert;
   an elastically supported element providing a torque compensating force acting between the base and the key insert; and
   one of a mechanical or an electronic dial indicator configured for determining the torque.

2. The device according to claim 1, wherein the handles are disposed in a plane perpendicular to the rotation axis of the device.

3. The device according to claim 1, wherein the key insert is disposed in a ring groove type indentation in the housing.

4. The device according to claim 3, wherein the key insert is fixated in the housing by a screw-in connector.

5. The device according to claim 4, wherein the screw-in-connection passes at least partially through the key insert and through the groove type indentation.

6. The device according to claim 1, wherein the elastically supported element is supported by a cylindrical spring.

7. The device according to claim 1,
   wherein the key insert has a ring segment shaped configuration including the lateral opening, wherein
   the key insert comprises a bore hole being eccentric relative to the rotation axis of the device, and wherein
   the bore hole is adapted for receiving an element for the screw-in connection or the plug-in connection with the device.

8. The device according to claim 7, wherein the key insert comprises protrusions, which are configured to engage indentations provided on an outer surface of clamping devices.

9. The device according to claim 7, wherein the key insert comprises a contact surface in contact with the elastically supported element.

10. The device according to claim 3, wherein the ring groove type indentation is configured around a circular segment shaped recess.

11. The device according to claim 1, wherein the plug-in connection comprises a clip type element with a plug-in connection member which can be plugged into a hole, wherein the clip type element is removably disposed in an indentation of the device.

12. The device according to claim 11, wherein between the clip type element and the housing, an interlocking connection is provided by a spring supported ball element or a rubber member.

13. The device according to claim 1, wherein a feeler of the dial indicator contacts a surface of the key insert.

* * * * *